(12) United States Patent
Nakayama

(10) Patent No.: US 9,542,141 B2
(45) Date of Patent: Jan. 10, 2017

(54) PRINTING APPARATUS AND PRINTING SYSTEM INCLUDING TRANSMISSION OF JOB LOG AND LOG IMAGE

(71) Applicant: Hiroto Nakayama, Nagoya (JP)

(72) Inventor: Hiroto Nakayama, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/013,639

(22) Filed: Aug. 29, 2013

(65) Prior Publication Data

US 2014/0063546 A1 Mar. 6, 2014

(30) Foreign Application Priority Data

Aug. 31, 2012 (JP) .................. 2012-191552

(51) Int. Cl.
*G06F 3/12* (2006.01)
(52) U.S. Cl.
CPC ............. *G06F 3/1273* (2013.01); *G06F 3/122* (2013.01); *G06F 3/1207* (2013.01); *G06F 3/129* (2013.01); *G06F 3/1203* (2013.01); *G06F 3/1274* (2013.01)
(58) Field of Classification Search
CPC ...... G06F 3/1207; G06F 3/1273; G06F 3/122; G06F 3/129; G06F 3/1274; G06F 3/1203
USPC ..................... 358/1.15, 1.13, 1.14
See application file for complete search history.

(56) References Cited

U.S. PATENT DOCUMENTS 7,827,220 B2 *  11/2010  Saito ...................... G03G 21/04
                                                  358/1.16
8,386,437 B2 *   2/2013  Monet ............... G06F 17/30011
                                                  707/665

2006/0290975 A1  12/2006  Murakami et al.
2006/0294154 A1 *  12/2006  Shimizu ............ G06F 17/30011
2007/0103715 A1 *   5/2007  Nakata .................. G06F 3/1203
                                                        358/1.14

(Continued)

FOREIGN PATENT DOCUMENTS

CN          1885327 A     12/2006
CN       101998014 A      3/2011

(Continued)

OTHER PUBLICATIONS

Japanese Office Action dated Mar. 15, 2016 issued in corresponding Japanese Patent Application No. JP 2012-191552.

(Continued)

*Primary Examiner* — Tammy Paige Goddard
*Assistant Examiner* — Walter Yehl
(74) *Attorney, Agent, or Firm* — Scully, Scott, Murphy & Presser, P.C.

(57) ABSTRACT

A printing apparatus including: an interface; a printing unit configured to print a print image included in a print job on a sheet; and a control device configured to: receive the print job via the interface; generate a log image in accordance with the print image included in the print job, the log image comprising the print image and attribute data; generate a job log in accordance with the print job, the job log comprising particular information, related to the print job, other than the print image; transmit the job log to a storage device via the interface; determine whether a predetermined condition is satisfied; and transmit the log image to the storage device via the interface, when determined that the predetermined condition is satisfied.

2 Claims, 5 Drawing Sheets

(56) References Cited

U.S. PATENT DOCUMENTS

| | | | | |
|---|---|---|---|---|
| 2007/0115495 | A1* | 5/2007 | Ebitani | H04N 1/00244 358/1.14 |
| 2007/0133054 | A1* | 6/2007 | Kobayashi | G06K 15/00 358/1.16 |
| 2007/0135930 | A1* | 6/2007 | Kirihara | G06F 3/1207 700/1 |
| 2007/0206212 | A1* | 9/2007 | Ohno | G06F 3/1218 358/1.14 |
| 2007/0279674 | A1* | 12/2007 | Oomura | G06F 21/608 358/1.14 |
| 2008/0005176 | A1* | 1/2008 | Shimizu | H04N 1/00244 |
| 2009/0180141 | A1* | 7/2009 | Takaishi | G03G 15/5075 358/1.15 |
| 2009/0231624 | A1* | 9/2009 | Saito | H04N 1/32101 358/1.15 |
| 2010/0005167 | A1* | 1/2010 | Kishimoto | H04N 1/00347 709/224 |
| 2010/0103449 | A1 | 4/2010 | Lee et al. | |
| 2011/0032563 | A1* | 2/2011 | Matsuzawa | H04N 1/00222 358/1.15 |
| 2011/0149344 | A1* | 6/2011 | Nakamura | G06F 11/0733 358/1.15 |
| 2011/0286035 | A1* | 11/2011 | Uruma | G06F 3/1203 358/1.15 |
| 2013/0063777 | A1* | 3/2013 | Nishio | G06F 3/1207 358/1.15 |
| 2014/0063546 | A1* | 3/2014 | Nakayama | G06F 3/1273 358/1.15 |

FOREIGN PATENT DOCUMENTS

| | | |
|---|---|---|
| JP | 2007-166176 A | 6/2007 |
| JP | 2008-042803 A | 2/2008 |
| JP | 2008-152402 A | 7/2008 |
| JP | 2011-243092 A | 12/2011 |

OTHER PUBLICATIONS

Chinese Office Action dated Feb. 6, 2016 from related Chinese Patent Application No. 201310388875.9, together with an English language translation.

* cited by examiner

PRINTING APPARATUS AND PRINTING SYSTEM INCLUDING TRANSMISSION OF JOB LOG AND LOG IMAGE

CROSS-REFERENCE TO RELATED APPLICATIONS

This application claims priority from Japanese Patent Application No. 2012-191552 filed on Aug. 31, 2012, the entire contents of which are incorporated herein by reference.

TECHNICAL FIELD

Aspects of the present invention relate to a printing apparatus and a printing system.

BACKGROUND

There has been known a printing apparatus in which a job log storing information accompanying a print job and a log image storing print images are generated in response to execution of the print job. Also, there has been known a technology for using a memory of a printing apparatus or a server which performs communication connection with a printing apparatus as a storage destination for job logs or log images.

For example, related-art discloses a technology for generating a job log including a job ID and an apparatus ID and a log image related to print images after execution of a print job, and transmitting the log image to a server before printing and transmitting the job log to the server after the printing.

However, the above described technology according to the related art has the following problem. That is, the log image is transmitted to a storage device for logs before the printing. For this reason, there is a fear that an amount of data being communicated is large each time a print job is performed and thereby causing network load.

SUMMARY

According to an aspect of the present invention, there is provided a printing apparatus including: an interface; a printing unit configured to print a print image included in a print job on a sheet; and a control device configured to: receive the print job via the interface; generate a log image in accordance with the print image included in the print job, the log image comprising the print image and attribute data; generate a job log in accordance with the print job, the job log comprising particular information, related to the print job, other than the print image; transmit the job log to a storage device via the interface; determine whether a predetermined condition is satisfied; and transmit the log image to the storage device via the interface, when determined that the predetermined condition is satisfied.

According to another aspect of the present invention, there is provided a printing system including: a printing apparatus; and a storage device communicatively connected to the printing apparatus, wherein the printing apparatus includes: a first interface; a printing unit configured to print a print image included in a print job on a sheet; and a first control device configured to: receive the print job via the first interface; generate a log image in accordance with the print image included in the print job, the log image comprising the print image and attribute data; generate a job log in accordance with the print job, the job log comprising particular information, related to the print job, other than the print image; transmit the job log to the storage device via the first interface; determine whether a predetermined condition is satisfied; and transmit the log image to the storage device via the first interface, when determined that the predetermined condition is satisfied, and wherein the storage device includes: a second interface; a second controller configured to: receive the job log and the log image transmitted from the printing apparatus via the second interface; and a storage area configured to store the received job log and log image.

According to the present invention, it is possible to implement a printing apparatus and a printing system in which a communication load is low in the printing apparatus which communicates with a storage device for storing job logs and log images.

DETAILED DESCRIPTION

Hereinafter, an embodiment of a printing system according to the present invention will be described in detail with reference to the accompanying drawings. The present embodiment is obtained by applying the present invention to a printing system including a server and a Multi Function Peripheral (MFP) having an image reading function and an image forming function.

[Configuration of System]

Figure 1:
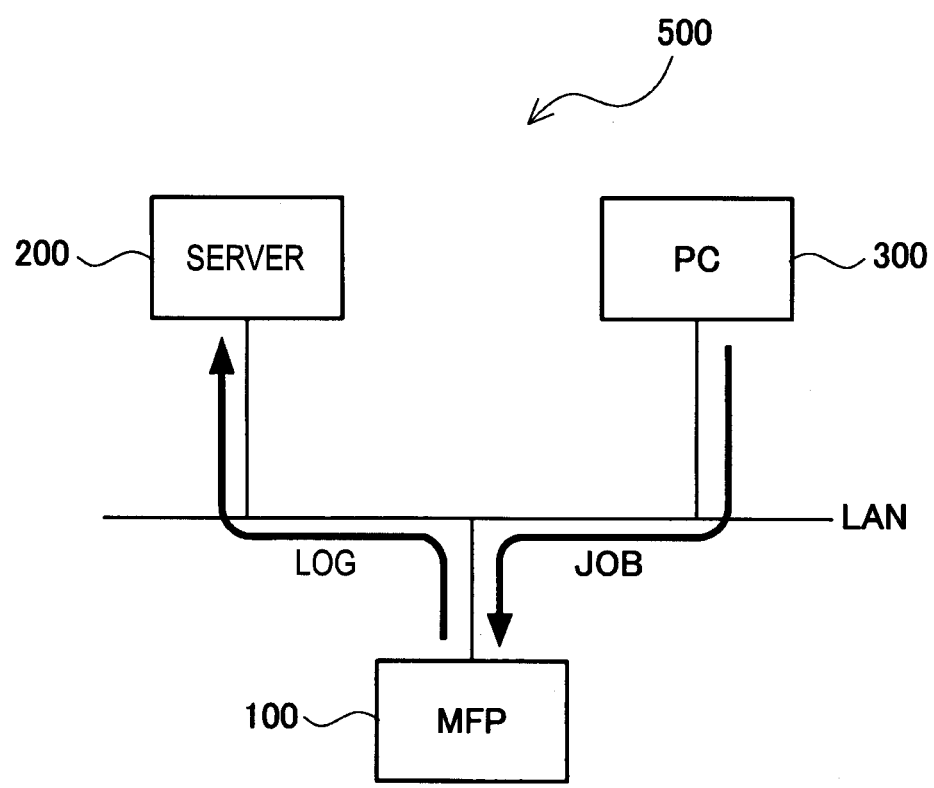
FIG. 1 is a schematic configuration view illustrating a system configuration according to an embodiment.

As shown in FIG. 1, an MFP 100, a server 200, and a PC 300 are connected to one another, thereby constituting a printing system 500 of the present embodiment. The MFP 100 receives a print job from the PC 300, and performs printing on the basis of the received print job, thereby outputting a printed material. Further, the MFP 100 generates a log which is the log of performance of the print job, from the received print job. Then, the MFP 100 transmits the generated log to the server 200.

The PC 300 transmits a print job to the MFP 100 on the basis of an operation of a user. The server 200 stores the log transmitted from the MFP 100. The MFP 100 is an example of a printing apparatus, and the server 200 is an example of a storage device. Further, the printing system 500, in which the MFP 100 and the server 200 are connected to each other such that communication is possible, is an example of a printing system.

[Electrical Configuration of MFP]

Figure 2:
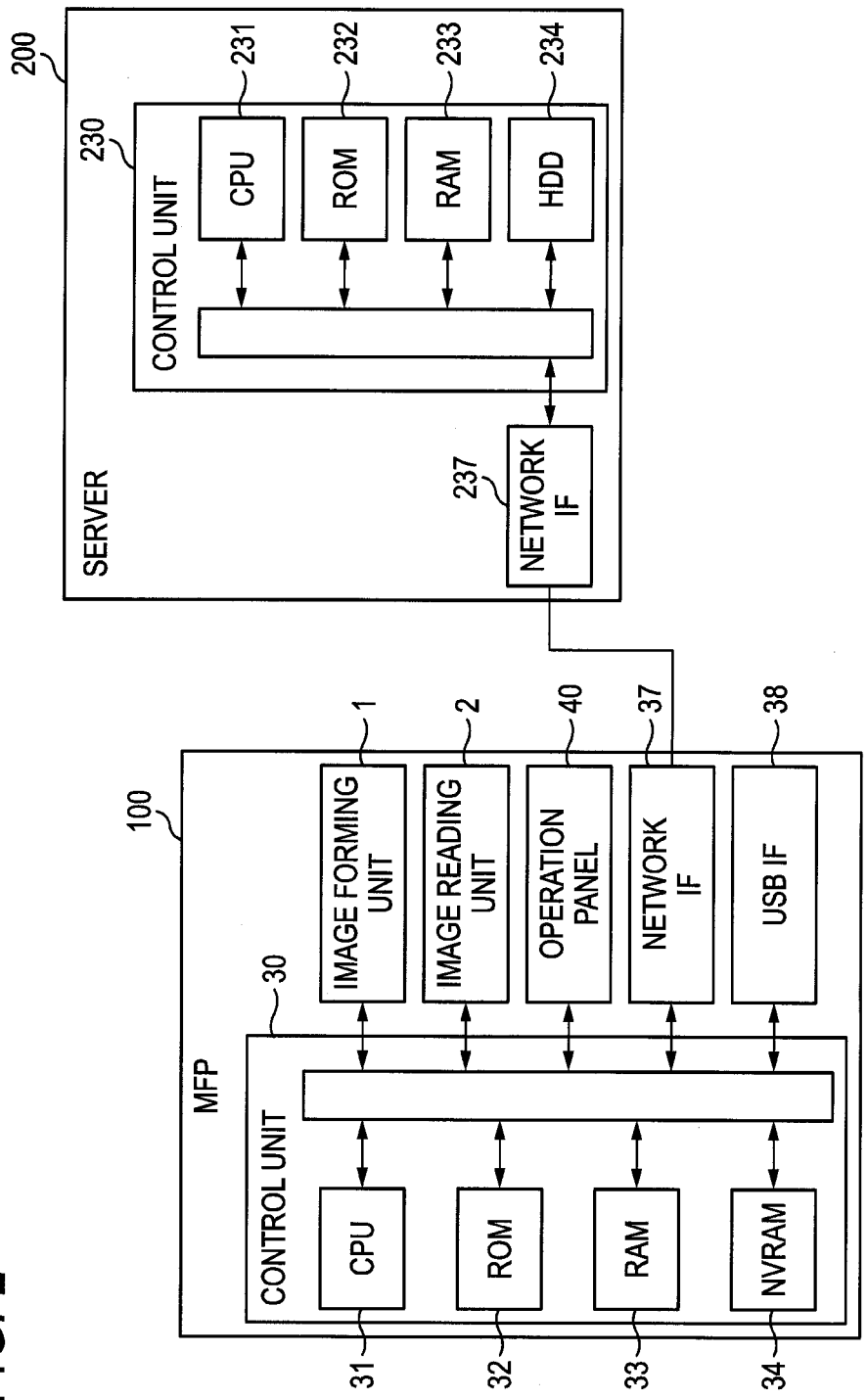
FIG. 2 is a block diagram illustrating the electrical configuration of a Multi Function Peripheral (MFP)

Next, the electrical configuration of the MFP 100 will be described. As shown in FIG. 2, the MFP 100 has a control unit 30 which includes a CPU 31, a ROM 32, a RAM 33, and a non-volatile RAM (NVRAM) 34. Further, the MFP 100 includes an image forming unit 1 for printing images on sheets, an image reading unit 2 for reading images of documents, and an operation panel 40 for receiving user's operations. Furthermore, the control unit 30 is electrically connected to the image forming unit 1, the image reading unit 2, the operation panel 40, a network interface 37, and a USB interface 38.

The image forming scheme of the image forming unit 1 may be, for example, an electrophotographic scheme or an inkjet scheme. Also, the image forming unit 1 may be able to form color images, or may be for forming monochrome images only. The image forming unit 1 is an example of a printing unit.

The image reading unit 2 reads images of documents. The image reading unit 2 has, for example, an image sensor. The image sensor radiates light toward a facing document, converts the reflected light from the document into an electric signal, and outputs image data of the document.

The CPU 31 performs computations for implementing various functions such as an image reading function and an image forming function in the MFP 100, and is a core for image processing control. The CPU 31 is an example of a control device. According to programs read from the ROM 32, the CPU 31 controls each component of the MFP 100 while storing the process results in the RAM 33. Also, the CPU 31 performs image processing on image data, such as image data received through the network interface 37 or the USB interface 38, or image data obtained by the image reading unit 2, for example, according to image processing programs read from the ROM 32, and performs control such that the image forming unit 1 performs a printing operation.

The ROM 32 stores various control programs for controlling various components such as the image forming unit 1, various settings, initial values, etc. The RAM 33 is used as a work area into which various control programs are read, or as a storage area for temporarily storing various data. The NVRAM 34 is a non-volatile storage part, and is used as a storage area for saving various data and so on. The NVRAM 34 is an example of a non-volatile storage part.

The network interface 37 is connected to a network. The MFP 100 is capable of data communication with other information processing apparatuses such as the server 200 or the PC 300 through the network interface 37. Also, the USB interface 38 is connected to a peripheral device capable of USB connection, for example, a flash memory. The MFP 100 is capable of data communication with external peripheral devices through the USB interface 38.

Also, as shown in FIG. 2, the server 200 has a control unit 230 which includes a CPU 231, a ROM 232, a RAM 233, and a HDD 234. Further, the control unit 230 is electrically connected to a network interface 237. In the HDD 234 of the server 200, an application for browsing logs generated by the MFP 100 is incorporated.

The network interface 237 of the server 200 is connected to the network interface 37 of the MFP 100 through a network such as a LAN. The HDD 234 of the server 200 is a non-volatile storage area. The server 200 stores logs received from the MFP 100 in the HDD 234. The HDD 234 of the server 200 is an example of a storage area.

[Printing and Log Transmitting Process]

Figure 3:
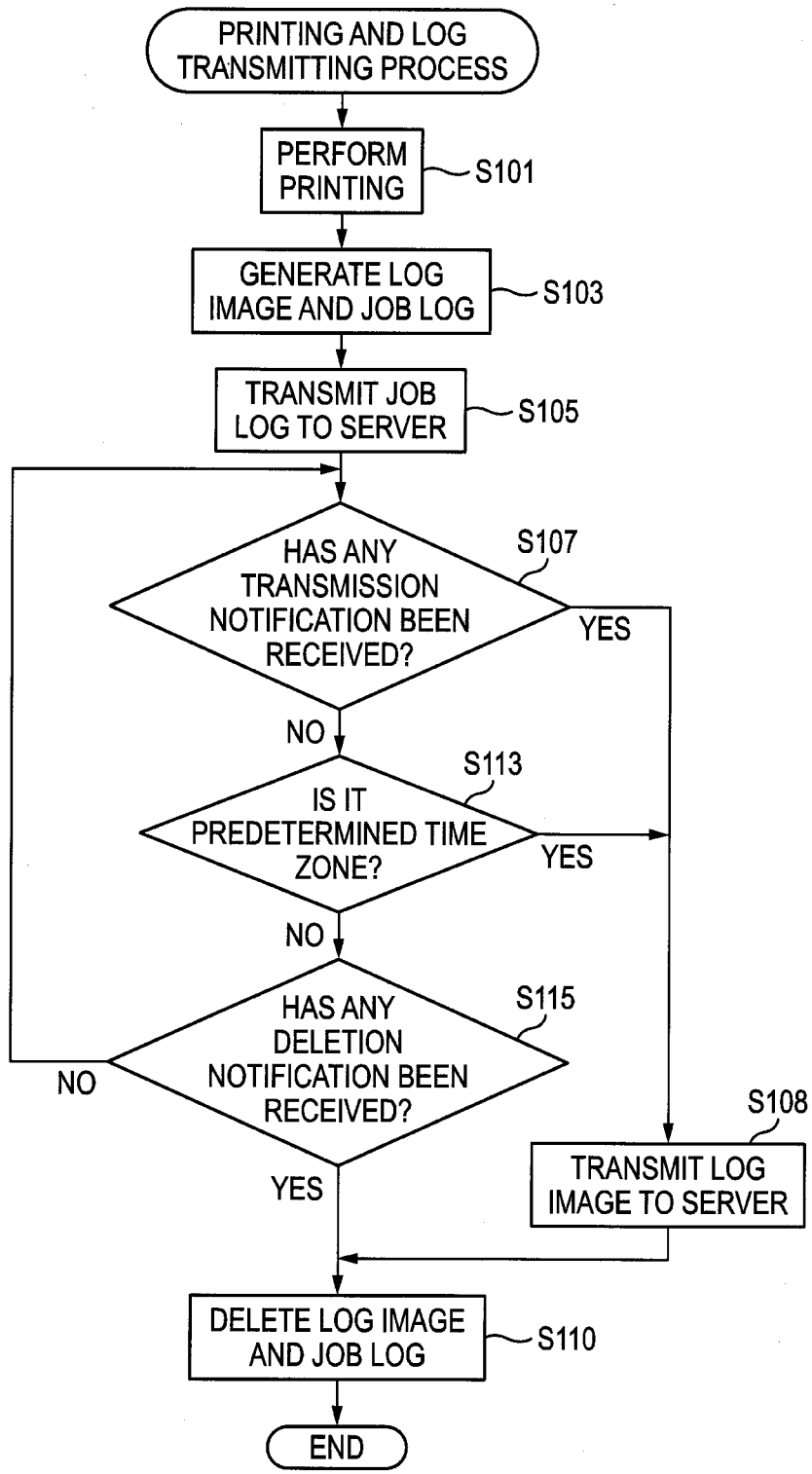
FIG. 3 is a flow chart illustrating the procedure of a printing and log transmitting process.

Next, a printing and log transmitting process which the CPU 31 of the MFP 100 performs will be described with reference to a flow chart of FIG. 3. The process is performed in response to the MFP 100 receiving a print job. Here, receiving a print job includes not only receiving a command including print images from an external apparatus through the network interface 37, but also receiving a copy command from the operation panel 40. In a case of receiving a print job according to the copy command, image data of a document read in the image reading unit 2 of the MFP 100 corresponds to a print image.

If the printing and log transmitting process starts, first, in STEP S101, the CPU 31 performs control such that the image forming unit 1 prints print images of the print job on sheets. Accordingly, a printed material is formed, and is output to the outside of the MFP 100.

Next, in STEP S103, the CPU 31 generates a log image and a job log from the received print job. Both of the log image and the job log are parts of a log which is the log of performance of the print job. By combining the log image and the job log, one complete log can be obtained. It is preferable that there should be no redundant information between the log image and the job log. The CPU 31 may separately generate the log image and the job log from the beginning, or may generate one log and divide the log into the log image and the job log afterwards.

The log image is a log related to a print image. The log image includes various data, for example, image data such as bitmap data of all print images, compressed image data of a PDF or the like, and image data of a portion of the print images. Meanwhile, the job log is a log related to information other than the print image. The job log is a log including attribute information of the print job, and includes various information, for example, user information, apparatus information, printing date and time, printing settings (number of copies, print size, color or monochrome mode, simplex or duplex mode, etc.). The job log may further include document information such as character data included in the print images. The job log is likely to have a smaller amount of data than the log image. Further, it is preferable that the job log does not include image data.

Figure 4:
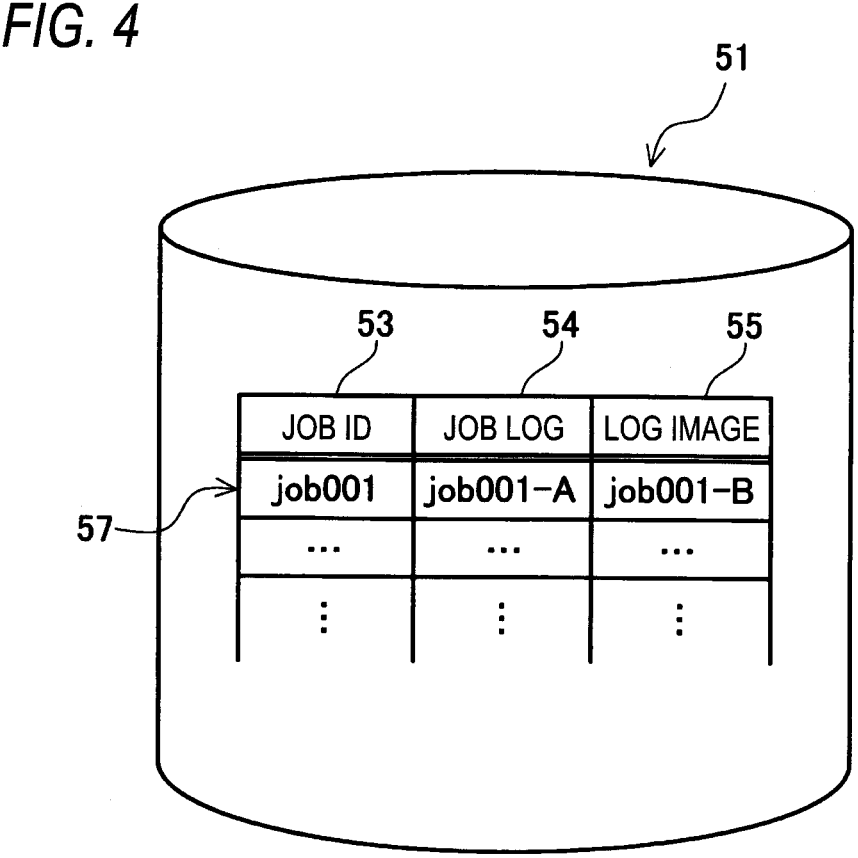
FIG. 4 is an explanatory view illustrating a database.

The CPU 31 causes the RAM 33 to temporarily store the generated log image and job log. At this time, the CPU 31 associates the log image and the job log with each other, for example, by using a job ID. Regarding this, the NVRAM 34 includes a database 51 as shown in FIG. 4. The CPU 31 uses the database 51 to store the job ID, the log image, and the job log in association with one another.

In the database 51, a job ID 53, a job log name 54, and a log image name 55 are written. If a print job is received, the CPU 31 sets a job ID to the print job and generates a record in the database 51. In the example of FIG. 4, a record 57 in which a job ID is "job001", a job log name is "job001-A", and a log image name is "job001-B" is generated.

Subsequently, in STEP S105, the CPU 31 transmits only the job log of the logs generated in STEP S103, together with the job ID, to the server 200. In other words, after the printing terminates, the CPU 31 transmits the job log to the server 200 before transmitting the log image. The server 200 stores the job log received from the MFP 100 in association with the job ID in the HDD 234. Also, the CPU 31 may delete the job log, having been transmitted, from the RAM 33.

The printing may also be performed after the generation of the logs, or after the transmission of the job log. In other words, STEP S101 may be performed between STEPS S103 and S105, or next to STEP S105. However, in order to avoid recording of a log of unperformed printing due to cancel of the printing, it is preferable to transmit the job log after the printing.

Subsequently, the CPU 31 determines whether a predetermined condition for determining transmission of the log image is satisfied. Only when it is determined that the predetermined condition is satisfied, the CPU 31 transmits the generated log image to the server 200. During a period in which the predetermined condition is not satisfied, the CPU 31 does not perform transmission of the log image. Therefore, after the transmission of the job log, the log image is transmitted at a timing different from that of the job log transmitted in STEP S105.

In STEP S107, the CPU 31 determines whether any transmission notification has been received, as one of the predetermined condition. A transmission notification is transmitted for each previously transmitted job log and requests the server 200 to transmit a log image corresponding to the job log. Accordingly, a transmission notification is transmitted together with a job ID added thereto. The CPU 31 uses the job ID added to the received transmission notification to refer to the database 51, thereby being capable of specifying a corresponding log image.

If it is determined that the transmission notification has been received (Yes in STEP S107), in STEP S108, the CPU 31 transmits the log image corresponding to the job log to the server 200. In other words, in a case of receiving a transmission notification from the server 200, the CPU 31 determines that the predetermined condition is satisfied, and transmits the log image of the job specified by the job ID added to the transmission notification to the server 200. Therefore, it can be expected that the log image will be transmitted from the MFP 100 according to the convenience of the server 200.

The transmission notification is automatically transmitted from the server 200. Alternatively, the transmission notification may be transmitted at a timing when the administrator of the system performs a predetermined operation on the server 200. Or, the administrator of the system may designate a specific print job and give an instruction to transmit the transmission notification thereto.

Further, if the log image is transmitted to the server 200, in STEP S110, the CPU 31 deletes the log image having been transmitted, from the RAM 33. If the job log has not been deleted yet, the job log will also be deleted. Therefore, the MFP 100 can efficiently use the RAM 33. Further, the CPU 31 deletes the record including the logs deleted in STEP S110 from the database 51 of the NVRAM 34. The deletion of the logs and the record causes all processes with respect to the print job to terminate. Accordingly, the printing and log transmitting process terminates.

If the transmission notification has not been received (No in STEP S107), in STEP S113, the CPU 31 determines whether a predetermined timing since the job log has been transmitted is reached.

The predetermined timing may be within a particular time range when communication traffic between the MFP 100 and the server 200 is low. For example, after the end of work, a holiday, in the early morning, or the like, are examples of the particular time range. The predetermined timing may be set in advance by the user, or may be set according to the status of system usage, on the basis of the status of use of the system, by the MFP 100. The determination on whether it is the predetermined timing is also one of the predetermined conditions.

If it is determined that the predetermined timing has come (Yes in STEP S113), in STEP S108, the CPU 31 transmits the log image to the server 200. In other words, if the predetermined timing has come, the CPU 31 determines that the predetermined condition is satisfied. Therefore, a risk that the communication load will be excessive is low.

If the log image is transmitted to the server 200, in STEP S110, the CPU 31 deletes the logs stored in the RAM 33. Further, the CPU 31 deletes the record including the deleted logs from the database 51 of the NVRAM 34. The deletion of the logs and the record causes all processes with respect to the print job to terminate. Therefore, the printing and log transmitting process terminates.

If it is not within the predetermined timing (No in STEP S113), in STEP S115, the CPU 31 determines whether any deletion notification has been received. The deletion notification is a notification for requesting to delete the log image corresponding to the previously transmitted job log without transmitting the log image to the server 200. Accordingly, a job ID is added to the deletion notification, and the CPU 31 can use the job ID to specify the log image to be deleted.

For example, if transmission of the log image is not requested any more with respect to the print job, the deletion notification is received from the server 200. The server 200 transmits the deletion notification, for example, if the previously transmitted job log has been deleted by the administrator. Here, if the deletion notification has no job ID attached thereto, all log images and job logs stored in the RAM 33 may be deleted.

If the deletion notification has been received (Yes in STEP S115), in STEP S110, the CPU 31 deletes the log image and the job log stored in the RAM 33. This makes it possible to quickly give room the storage area of the RAM 33. Further, the CPU 31 deletes the record including the logs deleted in STEP S110 from the database 51 of the NVRAM 34. The log image will not be transmitted to the server 200. The deletion of the logs and the record causes all processes to terminate with respect to the print job. Therefore, the printing and log transmitting process terminates.

If the deletion notification has not been received (No in STEP S115), the CPU 31 returns to STEP S107. Then, until any one of reception of a transmission notification (STEP S107), coming of the predetermined timing (STEP S113), and reception of a deletion notification (STEP S115) occurs, the CPU 31 continues monitoring.

[Transmission Notification]

Subsequently, an example of a case where the server 200 transmits the transmission notification to the MFP 100 will be described. The CPU 231 of the server 200 determines whether to transmit the transmission notification, on the basis of the load status of the server 200 and information of the previously transmitted job log.

The transmission notification is transmitted, for example, if information related to specific characters is included in the job log. For example, if document information such as character data is included in the print images, the CPU 231 of the server 200 determines whether any specific character is included in the document information. The specific characters are, for example, "Secret Information", "Confidential", etc. A list of those specific characters is stored in advance in the RAM 233 or HDD 234 of the server 200, or the like. Then, if any character registered in the list of specific characters is included in the information of the job log, the server 200 transmits the transmission notification to the MFP 100.

Here, the CPU 31 of the MFP 100 may extract images of characters from the image data before transmission of the job log, and add character information obtained by reading the characters from the images, to the job log. In this case, the CPU 231 of the server 200 determines whether any specific character is included in the added character information.

Or, for example, if information identifying a specific user is included in the job log, the transmission notification may be transmitted. A list of the IDs of users who requires attention and need to be monitored is stored in advance in the RAM 233 or HDD 234 of the server 200, or the like. Then, if the ID of the user having instructed the print job is included in the list of users requiring attention, the server 200 transmits the transmission notification to the MFP 100.

Here, the server 200 may perform the determination on whether there is a specific character, or whether the user having instructed the print job is a specific user, immediately after receiving the job log. Alternatively, the server 200 may have a dedicated application for performing the determinations, and may perform the determinations when receiving a performance instruction from the administrator.

Alternatively, the transmission notification may be transmitted, for example, if the job log is read out by the administrator. The administrator can start up an application for browsing logs in the server 200 and issue a read-out instruction on the application. If the job log is read out, a possibility that reading out of the log image would also be desired is high. Therefore, in the case where the job log is read out, the server 200 transmits the transmission notification to the MFP 100.

Also, the transmission notification may be transmitted, for example, if the amount of communication between the server 200 and the MFP 100 is small. To this end, the server 200 monitors the degree of network load of the network interface 237, and transmits a transmission notification to the MFP 100 if an amount of communication within a predetermined period is equal to or less than a threshold value. Also, the transmission notification may be transmitted, for example, if the processing load of the server 200 is low. Also, the server 200 may transmit a transmission notification when determining that the predetermined timing has come.

[Important-Data Storing Process]

In the above description, the MFP 100 stores the log image in the RAM 33 until the predetermined condition is satisfied. However, the information stored in the RAM 33 is deleted if the power of the MFP 100 is turned off. Taking this into account, the CPU 31 of the MFP 100 may determine whether the log image is important data, and perform a process of storing the log image in a non-volatile storage area in a case of determining that the log image is important data.

Figure 5:
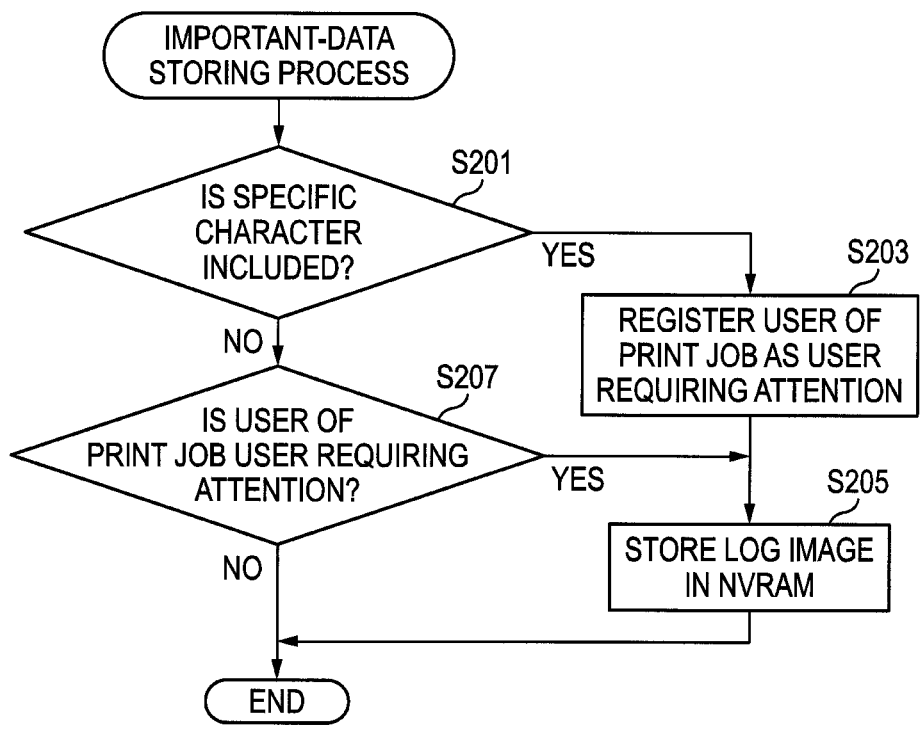
FIG. 5 is a flow chart illustrating the procedure of an important-data storing process.

The important-data storing process which the CPU 31 performs will be described with reference to a flow chart of FIG. 5. After the MFP 100 receives a print job and generates a log image and a job log with respect to that print job, the important-data storing process is performed by the CPU 31. The performance timing of the important-data storing process may be before transmission of the job log, for example, between steps S103 and S105 of FIG. 3, or may be after transmission of the job log, for example, between steps S105 and S107 of FIG. 3.

If the important-data storing process starts, in STEP S201, the CPU 31 determines whether specific character information is included at least one of the job log and the log image. To that end, the MFP 100 stores a list of specific character information in the ROM 32. Examples of the list of specific character information include a list of characters such as "Secret Information" and "Confidential", and a list of specific marks such as a "Secret Mark".

Then, if a character in the above-described list of character information is included in print texts of the images, the CPU 31 determines that the specific character information is included in the logs of the print job. Also, even if a mark in the list is included in the image data, the CPU 31 determines that the specific character information is included. Further, the CPU 31 may extract images of characters from the log image or the image data, read the characters from the images, and compare the characters with the list of specific character information.

Then, if it is determined that the specific character information is included in the logs of the print job (Yes in STEP S201), in STEP S203, the CPU 31 registers the ID of the user having transmitted the print job in the list of users requiring attention. The list of users requiring attention is, for example, a list of the IDs of users who have printed secret information in the past, or users who need to be monitored, for example, users who perform printing of a plurality of copies. In a case of a user having been already registered, the CPU 31 skips STEP S203. The list of users requiring attention is stored in the NVRAM 34.

Next, in STEP S205, the CPU 31 stores the log image of the print job in the NVRAM 34 which is a non-volatile storage part. That is, the CPU 31 moves the log image stored in the RAM 33 into the NVRAM 34. Information stored in the NVRAM 34 is not lost even if the power of the MFP 100 is turned off. Therefore, it is possible to prevent a loss of the log.

If it is determined that the specific character information is not included in the logs of the print job (No in STEP S201), in STEP S207, the CPU 31 determines whether the user ID of the user having transmitted that print job has been registered in the list of users requiring attention. If the user having transmitted the print job is a user registered in the list of users requiring attention (Yes in STEP S207), in STEP S205, the CPU 31 stores the log image of the print job in the NVRAM 34 which is a non-volatile storage part.

Meanwhile, if the user having transmitted the print job is not a user registered in the list of users requiring attention (No in STEP S207), it is unnecessary to move the log image, and thus the important-data storing process terminates. Here, after storing the log image in the NVRAM 34 in STEP S205, the CPU 31 may transmit information for calling the administrator's attention to the server 200.

In a case of storing the log image in the NVRAM 34 in the important-data storing process, the CPU 31 also rewrites the contents of the record of the database 51. Therefore, in a case of transmitting the log image, for example, in response to the transmission notification, the CPU 31 transmits the log image stored in the NVRAM 34 to the server 200. After the transmission of the log image, the CPU 31 deletes the log image stored in the NVRAM 34 and the record of the database 51.

The CPU 31 may perform the determination on the specific character information, and the determination on users requiring attention, in reverse order. In this case, the CPU 31 may perform the determination on users requiring attention before generating the job log or before printing. Also, the CPU 31 may perform only one of the determination on the specific character information and the determination on users requiring attention. Further, if it is determined that the print job is a job including the specific character information or a job of a user requiring interest, exceptionally, the CPU 31 may transmit the log image without determining whether the predetermined condition is satisfied.

As described above in detail, the MFP 100 generates two kinds of logs, that is, a log image and a job log, from a received print job. Then, the MFP 100 transmits the job log to the log image beforehand, and if it is determined that the predetermined condition is satisfied, the MFP 100 transmits the log image at a timing different from transmitting the job log and after transmitting the job log. That is, only the job log is first transmitted, and the log image is not transmitted at the same time as the job log. Therefore, reducing the communication load can be expected.

The present embodiment is merely an example, and does not limit the present invention. Therefore, the present invention can be improved and modified in various forms without departing from the scope.

For example, the present invention is not limited to the MFP, but is applicable to any apparatuses having an image forming function, such as a copy machine, a printer, and a FAX. The present invention can also be applied to printing apparatuses which do not include the image reading unit 2. Also, the storage device is not limited to the server 200 connected to the MFP 100 through the network. The storage device may be a storage device directly and externally attached to or built in the MFP 100. Also, for example, in FIG. 1 of the above described embodiment, one MFP 100, one server 200, and one PC 300 are shown. However, a plurality of MFPs, servers, or PCs may be included. Also, the server 200 and the PC 300 may be directly connected.

Also, in the above-described embodiment, the MFP determines both of whether the transmission notification has been received and whether the predetermined timing has come, and if at least one of them is satisfied, the MFP determines that the predetermined condition is satisfied. However, the MFP may determine only one of them. Also, a condition that a predetermined time has elapsed after the job log transmitting part has transmitted the job log may be used as the predetermined condition. If the log image is transmitted after the predetermined time has elapsed from the time of the transmission of the job log, it is possible to avoid a situation where the log image is transmitted at the same timing with the job log. Also, it is possible to avoid a situation where the log image continues to remain in the printing apparatus without being transmitted.

Also, if the log image is unnecessary, the server 200 may transmit a transmission notification, instead of transmitting a deletion notification. The reason is that the log image is deleted from the MFP 100 by the transmission. Then, the transmitted log image may be deleted at the server 200. Also, the method of dividing a complete log into a job log and a log image is not limited to the above described method. The job log may include a portion of the image data.

Also, the processes disclosed in the embodiment may be performed by a single CPU, a plurality of CPUs, hardware such as an ASIC, or a combination thereof. Further, the processes disclosed in the embodiment can be implemented in various forms such as a recording medium having programs for performing those processes stored therein, or methods of performing those processes.

The present invention provides illustrative, non-limiting examples as follows:

(1) According to a first aspect, there is provided a printing apparatus including: an interface; a printing unit configured to print a print image included in a print job on a sheet; and a control device configured to: receive the print job via the interface; generate a log image in accordance with the print image included in the print job, the log image comprising the print image and attribute data; generate a job log in accordance with the print job, the job log comprising particular information, related to the print job, other than the print image; transmit the job log to a storage device via the interface; determine whether a predetermined condition is satisfied; and transmit the log image to the storage device via the interface, when determined that the predetermined condition is satisfied.

The printing apparatus disclosed in this specification generates two kinds of logs from the received print job. That is, the log image which is a log related to the print images, and the job log which is a log related to information other than the print images, are generated from the received print job. Then, the printing apparatus transmits the job log to the storage device before transmitting the log image. Meanwhile, if it is determined that the predetermined condition is satisfied, after the job log is transmitted, the printing apparatus transmits the log image at a timing different from transmitting the job log.

That is, only the job log is first transmitted, and the log image is not transmitted at the same time as the job log. Therefore, it can be expected that a communication load at the time of the transmission of the job log is reduced. Examples of the job log are for example, document information and attribute information of the print job such as user information and printing date and time. A job log and a log image generated from the same print job are associated with each other. Therefore, a log image corresponding to a job log is a log image generated from the same job as that of the job log.

Examples of the predetermined condition include a condition that a transmission request is received from the storage device, a condition that a predetermined timing has been reached, and a condition that the amount of communication with the storage device within a predetermined period should be equal to or less than a threshold value. Also, the transmission of the job log may be performed in response to performance of the print job, or before printing, or after printing. In order to avoid recording of a log of unperformed printing due to cancel of printing, it is preferable to transmit the job log after the printing. Furthermore, the storage device may be an external server which is connected through a network, or a built-in server. In addition, the print job may be received from an external apparatus through a network, or may be received from a scanner unit included in the printing apparatus like a copy unit.

(2) In a second aspect, there is provided the printing apparatus according to the first aspect, wherein the control device is configured to determine that the predetermined condition is satisfied when at least one of the job log and the attribute data includes information related to a specific character.

For example, if specific character information such as "Secret Information" or "Confidential" is included in the job log such that the degree of importance is predicted to be high, it is preferable to store the log image in the storage device. The determination on the character information may be performed by the storage device or a determining device other than the storage device.

(3) In a third aspect, there is provided the printing apparatus according to the first aspect, wherein the control device is configured to determine that the predetermined condition is satisfied when at least one of the job log and the attribute data includes information identifying a specific user.

In a case of a print job from a user who needs to be monitored, it is preferable to store the log image in the storage device.

(4) In a fourth aspect, there is provided the printing apparatus according to the first aspect, wherein the control device is configured to determine that the predetermined condition is satisfied at a particular timing since the job log has been transmitted.

If a timing during which an amount of communication of a network is small is set as the predetermined timing, it is possible to avoid an increase in communication load when the log image is transmitted.

(5) In a fifth aspect, there is provided the printing apparatus according to the first aspect, wherein the control device is configured to determine that the predetermined condition is satisfied when a predetermined time has elapsed after the job log is transmitted.

Accordingly, even if the log image is transmitted after the predetermined time has elapsed from the time of the transmission of the job log, it is possible to avoid a situation where the log image is transmitted at the same timing with the job log. Also, it is possible to avoid a situation where the log image continues to remain in the printing apparatus without being transmitted.

(6) In an sixth aspect, there is provided the printing apparatus according the first aspect, wherein, when receiving a deletion notification for requesting deletion of at least one of the job log and the log image, the control device is further configured to delete the at least one of the job log and the log image from a storage area of the printing apparatus.

If the job log is deleted at the storage device side, thereafter, a possibility that the log image is requested to be read out is very low. Therefore, the necessity of continuously storing the logs on the printing apparatus side is also low. For this reason, the job log and the log image are deleted from the storage area of the printing apparatus. Therefore, it is possible to efficiently use the storage area of the printing apparatus.

(7) In a seventh aspect, there is provided the printing apparatus according to the first aspect, further including: a non-volatile storage part, wherein the control device is further configured to: determine whether a specific character is included in at least one of the job log and the log image; store at least the log image in the non-volatile storage part, when it is determined that the specific character information is included in at least one of the job log and the log image, and transmit the stored log image to the storage device when determined that the predetermined condition is satisfied.

If specific character information such as "Secret Information" or "Confidential" is included such that the degree of importance is predicted to be high, it is preferable to store at least the log image in the non-volatile storage part, thereby preventing loss of the log. Of course, the job log may be stored together with the log image.

(8) In an eighth aspect, there is provided the printing apparatus according to the first aspect, further including: a non-volatile storage part, wherein the control device is further configured to: determine whether a user of the print job matches with a specific user; and save at least the log image in the non-volatile storage part when it is determined that the user of the print job matches with the specific user, and transmit the stored log image to the storage device when determined that the predetermined condition is satisfied.

In a case of a print job from a user who needs to be monitored, it is preferable to store a log image in the non-volatile storage part, thereby preventing loss of the log. Of course, the job log may be stored together with the log image.

(9) In a ninth aspect, there is provided a printing system including: a printing apparatus; and a storage device communicatively connected to the printing apparatus, wherein the printing apparatus includes: a first interface; a printing unit configured to print a print image included in a print job on a sheet; and a first control device configured to: receive the print job via the first interface; generate a log image in accordance with the print image included in the print job, the log image comprising the print image and attribute data; generate a job log in accordance with the print job, the job log comprising particular information, related to the print job, other than the print image; transmit the job log to the storage device via the first interface; determine whether a predetermined condition is satisfied; and transmit the log image to the storage device via the first interface, when determined that the predetermined condition is satisfied, and wherein the storage device includes: a second interface; a second controller configured to: receive the job log and the log image transmitted from the printing apparatus via the second interface; and a storage area configured to store the received job log and log image.

(10) In a tenth aspect, there is provided the printing system according to the ninth aspect, wherein the first control device is configured to determine that the predetermined condition is satisfied when a notification that requests transmission of the log image to the storage device has been received, and wherein the storage device is configured to determine to transmit the notification to the printing apparatus.

(11) In an eleventh aspect, there is provided the printing system according to the tenth aspect, wherein the storage device is configured to transmit the notification to the printing apparatus when determined that the job log includes information related to a specific character.

(12) In a twelfth aspect, there is provided the printing system according to the tenth aspect, wherein the storage device is configured to transmit the notification to the printing apparatus when determined that the job log includes information identifying a specific user.

(13) In a thirteenth aspect, there is provided the printing system according to the tenth aspect, wherein the storage device is configured to transmit the notification to the printing apparatus when the job log is read out by the storage device.

What is claimed is:
1. A printing system comprising:
a printing apparatus; and
a storage device communicatively connected to the printing apparatus,
wherein the printing apparatus includes:
a first interface;
a printing device configured to print a print image included in a print job on a sheet;
a first processor; and
first memory configured to store first executable instructions that, when executed by the first processor, cause the printing apparatus to:
receive the print job via the first interface;
generate a log image in accordance with the print image included in the print job, the log image comprising the print image and attribute data;
generate a job log in accordance with the print job, the job log comprising character information obtained by reading the print image included in the print job and particular information, related to the print job, other than the print image;
transmit the job log to the storage device via the first interface;
determine whether a notification that requests transmission of the log image to the storage device has been received from the storage device after transmitting the job log;
when it is determined that the notification that requests the transmission of the log image to the storage device has been received from the storage device after transmitting the job log, transmit the log image to the storage device via the first interface, and delete the log image and the job log from a storage area of the printing apparatus;
when it is determined that the notification that requests the transmission of the log image to the storage device has not been received from the storage device after transmitting the job log, delete the log image and the job log from the storage area of the printing apparatus;

wherein the storage device includes:
  a second interface;
  a first storage area configured to store the job log transmitted from the printing apparatus;
  a second storage area configured to store a specific character in advance;
  a second processor; and
  second memory configured to store second executable instructions that, when executed by the second processor, cause the storage device to:
    receive the job log transmitted from the printing apparatus via the second interface;
    store the job log in the first storage area;
    determine whether the job log includes the specific character stored in the second storage area; and
    transmit the notification to the printing apparatus when it is determined that the job log includes the specific character stored in the second storage area.

2. The printing system according to claim 1,
wherein the first executable instructions, when executed by the first processor, cause the printing apparatus to further:
  when it is determined that the notification that requests the transmission of the log image to the storage device has not been received from the storage device,
    determine whether a deletion notification for requesting deletion of at least one of the job log and the log image has been received from the storage device, and
    perform the deleting of the log image, which has not been transmitted to the storage device, and the job log from the storage area of the printing apparatus, when it is determined that the deletion notification has been received, and
wherein the second executable instructions, when executed by the second processor, cause the storage device to further:
  transmit the deletion notification to the printing apparatus.

* * * * *